United States Patent [19]

Hamstra

[11] Patent Number: 5,016,221

[45] Date of Patent: May 14, 1991

[54] FIRST-IN, FIRST-OUT (FIFO) MEMORY WITH VARIABLE COMMIT POINT

[75] Inventor: James R. Hamstra, Shorewood, Minn.

[73] Assignee: National Semiconductor Corporation, Santa Clara, Calif.

[21] Appl. No.: 444,741

[22] Filed: Dec. 1, 1989

[51] Int. Cl.⁵ .............................................. G11C 7/00
[52] U.S. Cl. ............................... 365/221; 365/189.07
[58] Field of Search ..................... 365/78, 221, 189.07, 365/189.02; 340/799

[56] References Cited

U.S. PATENT DOCUMENTS

| | | | |
|---|---|---|---|
| 3,979,733 | 9/1976 | Fraser | 364/200 |
| 4,095,283 | 6/1978 | Campbell et al. | 365/221 |
| 4,419,746 | 12/1983 | Hunter et al. | 365/189 |
| 4,433,394 | 2/1984 | Torii et al. | 365/221 |
| 4,507,760 | 3/1985 | Fraser | 365/221 |

Primary Examiner—Joseph A. Popek
Attorney, Agent, or Firm—Limbach, Limbach & Sutton

[57] ABSTRACT

A first-in, first-out (FIFO) memory configuration comprising a fully addressable memory (e.g. random access memory), a write pointer, a read pointer, and a third, "commit" pointer serving as a boundary between first and second subsets of data stored within the FIFO. During data reception, a comparator circuit compares a predetermined subset of incoming data with a predefined reference data set for determining whether the incoming data should be stored or aborted. This determination establishes the appropriate memory address value for positioning the commit pointer. The first subset of data behind the commit pointer may selectively be stored, while the second subset of data ahead of the commit pointer may selectively be aborted. During data transmission, a status register monitors the readiness of the data medium onto which the data is to be transmitted. If and/or when the data medium is ready to accept data, the commit pointer may be selectively positioned to demarcate data committed for transmission.

20 Claims, 3 Drawing Sheets

FIRST-IN, FIRST-OUT (FIFO) MEMORY WITH VARIABLE COMMIT POINT

BACKGROUND OF THE INVENTION

1. Field of the Invention

The present invention relates to data storage devices and, in particular, to a first-in, first-out ("FIFO") memory configuration having a third memory pointer, in addition to the normal read and write memory pointers, which effectively increases the storage capacity of the FIFO with respect to multi-word messages by decreasing the otherwise normal storage requirements.

2. Description of the Prior Art

Modern data communications systems are often connected so as to form a network consisting of several data processors interconnected via common, or shared, data medium. The use of a shared data medium allows the individual processors to communicate with one another, sharing instructions and data. An example of such a shared data medium is a local area network ("LAN").

The physical embodiment of the shared data medium may consist of any of several distinct types. Perhaps the most common type (or perhaps at least the most familiar) is a hard-wired "bus" configuration where one or more copper wires, cables or lines of conductive printed circuit etch conduct electrical signals which represent the instructions and data. The wires, cables or printed circuit etch are hard-wired to the individual data processors in the network. An example of this type is the data bus typically found in virtually any ordinary computer.

Another computer type of shared data medium is an electromagnetic link where electromagnetic signals (e.g., radio frequency or microwave) represent the instructions and data. The electromagnetic signals are transmitted and received over the air or through special cables (e.g., coaxial or tri-axial cables) by the individual data processors in the network. An example of this type is called "packet radio" and involves the transmission and reception of radio frequency signals containing destination address information. When a data processor within the network receives such a signal, it examines the destination address information contained therein to determine whether that processor is the destination processor for that particular signal. If it is, the signal's information is stored and used by that processor accordingly.

Yet another type of shared data medium becoming increasingly common is an optical fiber where a fiber-optic cable carries optical signals (e.g., pulses of light) which represent the instructions and data. This fiberoptic cable is "hard-wired" to the individual data processors in the network via fiberoptic connectors. The use of an optical fiber as the shared data medium has increased because modern data communications systems have become faster and more sophisticated. An example is the optical fiber ring LAN standard called the Fiber Distributed Data Interface ("FDDI").

Particularly when many data processors are interconnected to form a large network, some or perhaps even most of the instruction and/or data signals propagating through the shared data medium are not destined for nor intended for use by some or perhaps even most of the processors. Therefore, to avoid unnecessary signal manipulation and processing and to maintain high throughput of the signals which are destined for and/or intended for use by them, the individual data processors are typically provided with the capability to examine the instructions and/or data received from the shared data medium before committing thereto and performing any extensive operations thereon. Thus, the faster a processor can examine its received instructions and/or data and determine whether they are to be retained for use or discarded, the faster the processor can accept and process new instructions and/or data.

As the signal propagation rate of the shared data medium increases, the potential signal throughput increases. As the potential signal throughput increases, the time available to each processor for examining incoming instructions and/or data before committing thereto and operating thereon decreases. Therefore, as the signal throughput increases it becomes increasingly desirable to be able to quickly examine the incoming instructions and/or data and determine whether they should be retained for processing. This ability is particularly desirable when the shared data medium is an optical fiber since the potential signal throughput is so high and all instructions and/or data must pass through the processor's interface to the optical fiber anyway.

A "ring" architecture is becoming an increasingly common network architecture for high speed data communications systems. In a ring network such as FDDI, instead of merely connecting to the shared data medium and monitoring the data as it appears on the line, accepting and storing data only as desired, each processor's interface in an FDDI ring must become a serial element within the network. In other words, each processor's interface must be part of the network, serving as a data repeater. Each interface must be able to accept data from the network and immediately retransmit the data back into the network for examination and/or use by another processor, while at the same time, temporarily store the data, examine the data to see if it is intended for use by that particular processor, and copy and store the data if it is so intended.

Typically, this is done through the use of a data repeater register and a first-in, first-out ("FIFO") memory configuration within each processor's interface. The interface accepts and stores ("writes") data within both the data repeater register and the FIFO memory in the order in which it has been received. While data is being copied into the interface's FIFO, the interface examines the data and determines whether or not the data is to remain for use within that processor, or is to simply be discarded. If the data is not to remain and be used within that processor, the data within the FIFO memory is discarded (e.g., overwritten by subsequent inputted data). Meanwhile, the received data is immediately retransmitted into the network by the repeater register and continues to propagate through the shared data medium of the network.

This requisite capability for storing and examining data requires that the FIFO be at least as large as the longest subgroup of data (e.g., "header") within each group of data (e.g., "frame") that must be examined for deciding whether to copy and store the data. The reason for this is that typically the entire header (e.g., address fields) of the frame is examined before the decision is made to retain or discard the data. The point in the incoming data stream for this decision to retain or discard the data is called the "commit point," and it is often unknown where the commit point is in any given data frame. For some data frames, the commit point may be at the end of the frame, i.e., after all data has been received and written into the FIFO.

Furthermore, since the central processing unit ("CPU") within the data processor may be busy and unable to use the data immediately upon its initial storage, the FIFO should be even larger than the largest header in order to retain up to one full header for examination while completing the transfer of a previously received frame to the processor's main memory and/or CPU. Moreover, the data retained for use by the processor should be protected from being overwritten until it is no longer needed. This could easily require the use of a FIFO which would be so large, complex and expensive as to be economically unfeasible, or a FIFO which would need so many associated memory circuits as to be economically undesirable.

An example of a FIFO memory configuration potentially operable within such a data repeater within a LAN is described by Fraser, U.S. Pat. No. 4,507,760. Fraser's FIFO includes the usual "read" and "write" memory pointers, which are well known in the art. The read pointer "points" to the memory location from which data was last retrieved. As outgoing data is sequentially retrieved from the FIFO, the read pointer advances within the FIFO. The write pointer points to the memory location into which data was last stored. As incoming data is sequentially stored, the write pointer advances within the FIFO.

Fraser's FIFO configuration adds a third memory pointer which is used to point to the memory location wherein the last data word (e.g., byte) of the incoming data frame has been stored. However, Fraser's third memory pointer may only be used to indicate the end of a frame, and then only if the entire frame has been determined to have been received error-free. Thus, Fraser's FIFO configuration with a third memory pointer offers no advantages or capabilities with respect to demarcating between received data which is to be retained and used and data which is to be merely aborted, until the complete frame has been received and validated.

Therefore, there is a need for an economically feasible FIFO memory configuration which provides for selective retention and protection of received data, while also providing adequate unprotected storage capacity for further incoming data.

SUMMARY OF THE INVENTION

An object of the present invention is to provide an economically feasible FIFO memory configuration which provides for real-time retention and protection of programmably selected data.

A further object of the present invention is to provide a programmably selective means of demarcating memory locations within a FIFO for designating protected areas and unprotected areas.

The present invention uses a FIFO memory configuration providing first-in, first-out digital data storage and retrieval. But, in addition to the usual two memory pointers ("read" and "write") a third memory pointer is added to serve as a programmable boundary within the FIFO. During data reception, this third pointer may be used to mark the boundary between data which is to be retained and protected from being overwritten and other data which is potentially expendable. During data transmission, this third pointer may be used to demarcate data committed for transmission, e.g., data for which the data medium, into which the data is to be transmitted, is sufficiently ready and available to accept.

Incoming digital data is sequentially written into the FIFO and stored in the order in which it is received. Outgoing data is sequentially retrieved from the FIFO in the same manner. A random access memory ("RAM") is the addressable memory into which the data is stored and from which the data is retrieved.

A write pointer is used for addressing the memory location within the RAM into which incoming digital data is to be stored. A read pointer is used to address a memory location within the RAM from which digital data which has been stored is now to be retrieved. In accordance with the present invention, a third, "commit" pointer is used to address the memory location within the RAM which is to serve as the boundary between data deemed "committed" and data which is deemed "uncommitted."

During data reception, committed data is that for which a decision has been made to retain and protect from being overwritten and is available for reading out (e.g., for storage elsewhere and later use by the processor associated with the FIFO). Uncommitted data is that for which it has not yet been determined whether or not it is to be retained or protected, and regardless, is not yet available for reading out. Committed data is retained and protected from overwriting until it has been read out or until commitment has been revoked whereupon it becomes "non-data" in the sense that it is not to be retained or protected from overwriting. Uncommitted data, when determined not to be retained or protected, is simply aborted and/or overwritten by new incoming data.

A comparator circuit is used to selectively and programmably compare a predetermined portion of the incoming serial data bit stream with a preprogrammed, predefined bit pattern or patterns. This comparison is performed dynamically, i.e., the incoming data bits are compared to the predefined bit pattern as they are received and written into the FIFO. For example, frame control or address information contained within the incoming data's header may be compared against preprogrammed information corresponding thereto. The result of this comparison determines whether the incoming data is to be protected and retained for storage and/or use elsewhere, or merely aborted.

During data transmission, committed data is that for which a decision has been made to transmit onto the data medium. Uncommitted data is that for which no such decision has yet been made.

A status register monitors the readiness of the data medium to accept data from the FIFO. When the data medium is ready and the FIFO contains all the necessary data, data transmission onto the data medium occurs. If the data medium is ready but the FIFO does not contain all the necessary data, then data transmission onto the data medium occurs only if and/or when the FIFO contains enough data to continue transmitting its data onto the data medium uninterrupted, while the circuit or system supplying the data completes its data transfer into the FIFO.

To determine whether the FIFO does contain sufficient data, a circuit measures the quantity of data held by the FIFO, calculates how long it will take for the system supplying the data to finish its data transfer into the FIFO, and determines whether the FIFO contains enough data to continue transmitting uninterrupted, based upon the system-to-FIFO and FIFO-to-data medium data transfer rates.

These and other objectives, features and advantages of the present invention will be more readily understood upon consideration of the following detailed description of certain preferred embodiments and the accompanying drawings.

BRIEF DESCRIPTION OF THE DRAWINGS

Throughout the figures like numerals are used to designate like elements.

DETAILED DESCRIPTION OF THE INVENTION

Figure 1:
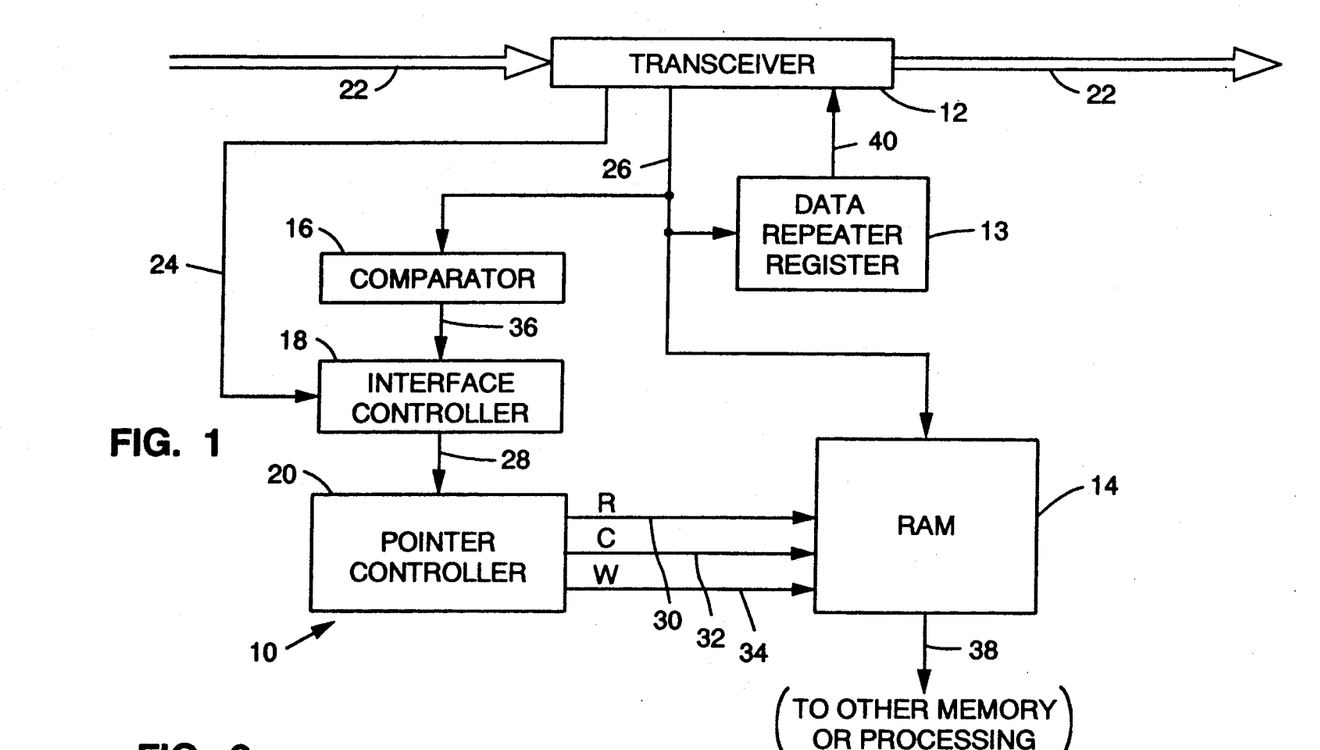
FIG. 1 illustrates a simplified, functional block diagram of a data communications system interface using an optical fiber ring LAN in which the FIFO memory configuration of the present invention is used in a data reception mode.

FIG. 1 illustrates, in simplified, functional block diagram form, the major functional elements of a data communications system interface 10 using an optical fiber ring LAN 22 in which the FIFO memory configuration 14 of the present invention may be used for data reception. Those of reasonable skill in the art will readily appreciate that use of this FIFO memory configuration 14 is not confined to this particular application and that this application is used merely for illustrative purposes only. For example, the FIFO memory configuration 14 of the present invention will perform equally well in system interfaces using a hard-wired bus (e.g., copper cables) or an electromagnetic link (e.g., "packet radio") as the shared data medium 22.

The basic functional elements in this particular application include an optical transceiver 12, a data repeater register 13, a random access memory ("RAM") 14, a comparator circuit 16, an interface controller 18 and a pointer controller 20. (Note that in some other applications the data repeater register 13 may not be necessary, particularly in a non-ring type of network topology, e.g., hard-wired bus.) These basic interface elements may be made up of combinations of numerous digital circuit devices commonly available and well known in the art.

The transceiver 12 receives binary information from the optical fiber ring LAN 22. Typically, this binary information will be in the form of a data frame 42 (described below for FIG. 2) consisting of a serial sequence of binary bits. Often this serial sequence of binary bits will be encoded according to a 4B/5B scheme as defined by the FDDI standard which is well known in the art. A signal 24 indicating that binary information has become available is sent by the transceiver 12 to the interface controller 18.

The binary information itself, converted within the transceiver 12 from a fiberoptic format to an electrical format, is made available as a binary information signal 26 to the data repeater register 13, RAM 14 and comparator 16. This binary information signal 26 may remain in the form of serial binary bits or may be converted by the transceiver 12 into groups of parallel bits, such as eight-bit bytes. The comparator 16 monitors the binary information signal 26 to determine whether it is to be held in the RAM 14 for subsequent transfer or downloading to other memory or processing (not shown). Meanwhile, the incoming binary information 26 is sequentially stored (e.g., bit by bit, or byte by byte) into both the data repeater register 13 and RAM 14 simultaneously in the order in which it is received.

Upon receiving the signal 24 indicating that binary information has become available, the interface controller 18 instructs RAM 14 as to where to store the incoming binary information 26. The interface controller 18 does this by sending instructions 28 to a pointer controller 20 which, in turn, provides the RAM 14 with memory pointers 30, 32, 34. As described in more detail below, these memory pointers 30, 32, 34 indicate to the RAM 14 which memory locations therein are to made subject to its read and write operations.

As discussed below, if and/or when the comparator 16 determines that the incoming binary information 26 is to be held in the RAM 14 for subsequent transfer to other memory or processing (not shown), it sends a signal 36 indicating this to the interface controller 18. The interface controller 18 may then control the storage of and/or access to the stored binary information within the RAM 14 by manipulating the pointers 30, 32, 34 appropriately (as described below for FIGS. 3A-3G) via the pointer controller 20. An output signal path 38 from the RAM 14 provides for this transferring o downloading of the stored binary information to other memory or processing (not shown).

Those of reasonable skill in the art will readily appreciate that the pointer controller 20 may consist of three registers (not shown), one each for holding the memory address values for the three memory pointers 30, 32, 34, plus simple control logic (not shown) for loading, incrementing and/or decrementing the registers. Such registers and control logic may be made up of combinations of numerous digital circuit devices commonly available and well known in the art.

Meanwhile, for this particular application, in order to maintain continuity of the binary information circulating within the optical fiber LAN 22, the binary information temporarily stored within the data repeater register 13 is continuously retrieved therefrom and sent out as an outgoing binary information signal 40 to the transceiver 12. The transceiver 12 then retransmits the binary information back into the LAN 22. Thus, the transceiver 12 and data repeater register 13 operate to maintain the integrity of the LAN 22 by performing together as a binary information repeater.

By storing the incoming binary information 26 within the RAM 14, the binary information may be protected and retained for subsequent transfer to other memory or processing (not shown). As explained below, using the three memory pointers 30, 32, 34 provides for this protective retention of binary information while allowing the transceiver 12 and RAM 14 to continue to input and store new binary information.

Figure 2:
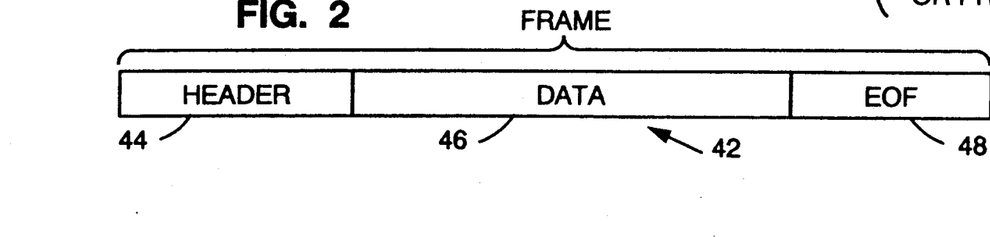
FIG. 2 illustrates the basic format for a data frame.

FIG. 2 illustrates the basic format for a data frame 42. The incoming binary information signal 26 consists of one or more data frames 42. Each data frame 42 includes a header 44, data 46 and an end-of-frame sequence (EOF) 48, each of which consists of a serial sequence of binary bits, often subdivided into eight-bit bytes. Referring back to FIG. 1, as the binary information signal 26 enters the RAM 14, the comparator 16 examines each frame 42 within the binary information signal 26. By means well known in the art, the comparator 16 compares a preprogrammed serial binary sequence or sequences (e.g., frame control or destination address information) with the serial binary sequences making up the header 44, data 46 and EOF 48 within each frame 42 within the binary information signal 26 entering the RAM 14. If and when a match results, that frame 42 becomes committed (see discussion below for FIG. 3C).

FIGS. 3A-3G illustrate the various possible states of the FIFO memory configuration within the RAM 14, including the corresponding status of the memory pointers 30, 32, 34.

Figure 3A:
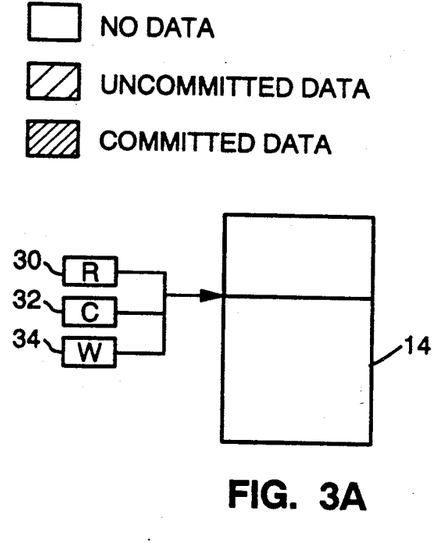
FIGS. 3A-3G illustrate various possible states of the FIFO memory configuration of the present invention.

FIG. 3A illustrates the state in which the RAM 14 is devoid of binary information and the three pointers 30, 32, 34 are all set at the same memory location, awaiting the arrival of the binary information signal 26.

Figure 3B:
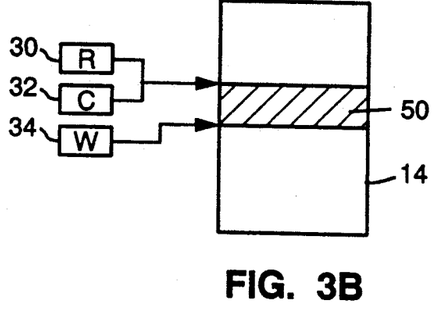

FIG. 3B illustrates the state where the RAM 14 has begun to receive and store the binary information signal 26. The write pointer ("W-pointer") 34 has advanced, indicating the next memory location into which the next bit or byte of the incoming binary information signal 26 is to be stored, leaving a block 50 of stored, but as yet uncommitted, binary information within the RAM 14. This stored binary information 50 will remain uncommitted until such time as the comparator 16 determines that this stored binary information 50 is to be retained by the RAM 14 for subsequent transfer to other memory or processing.

Figure 3C:
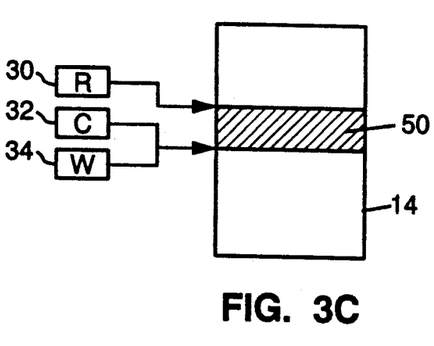

FIG. 3C illustrates the state where the stored binary information 50 has acquired status as committed binary information. If and when the comparator 16 determines that the incoming binary information 26 is to be retained for use by the CPU 18, the "commit" pointer ("C-pointer") 32 is advanced to coincide with the write pointer 34. Committed data 50 between the read pointer ("R-pointer") 30 and the commit pointer 32 is now available to be read out or downloaded via the RAM output 38 for storage and/or use elsewhere (e.g., for use by the processor (not shown) associated with the interface 10). The commit pointer 32 and write pointer 34 will advance together until all incoming binary information 26 has been stored, e.g., until an EOF 48 is received within the incoming binary information 26.

Figure 3D:
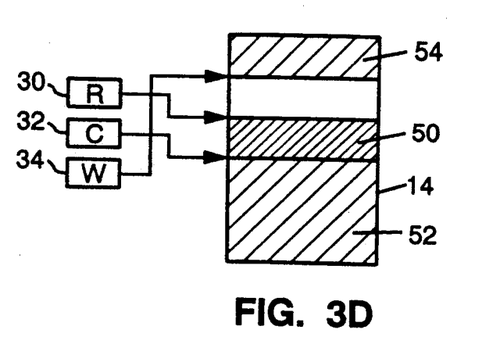

FIG. 3D illustrates the state where the committed binary information 50 constitutes a completed data frame 42, e.g., an EOF 48 has been received within the incoming binary information 26. The commit pointer 32 no longer advances and remains positioned at the end of this committed binary information 50. However, the write pointer 34 continues to advance with further incoming binary information 52, 54. When the write pointer 34 reaches the bottom of the FIFO queue within the RAM 14, it is reset to the top of the FIFO queue and advances once again as the remaining new binary information 54 is stored. This new binary information 52, 54 will maintain its uncommitted status unless and until the comparator 16 determines that it is to be retained and used.

The commit pointer 32 marks the end of this committed data frame 42. If the commit pointer 32 is advanced to indicate commitment to this newer incoming binary information 52, 54, this reference point marking the boundary between one data frame 42 and the next data frame 42 is lost. Therefore, if and/or when the incoming binary information 52, 54 constitutes a full data frame 42 (e.g., an EOF 48 has been received), and the previously committed binary information 50 has not yet been downloaded elsewhere or otherwise used, but further incoming binary information 26 continues to be received, one of three things must occur: (1) this as yet uncommitted binary information 52, 54 must be aborted (see discussion below); (2) the previously committed binary information 50 must be "revoked" (see discussion below for FIG. 3F); or (3) a unique EOF marker (not shown) must be stored at the end of the previously committed binary information 50.

However, if no further incoming binary information 26 is received, both the previously committed binary information 50 and the as yet uncommitted binary information 52, 54 may continue to be held within the RAM 14. Both may be so held until the latter is aborted or committed, the former is revoked or downloaded elsewhere, or new incoming binary information 26 is received. Thus, the commit pointer 32 and read pointer 30 (discussed below for FIG. 3E) may demarcate committed binary information 50 constituting no more than one full data frame 42, while possibly up to one additional data frame 42 of uncommitted binary information 52, 54 may also be temporarily held. And, as discussed above, if unique EOF markers (not shown) are written into the RAM 14 to demarcate each full data frame 42, then committed binary information 50 constituting more than one full data frame 42 may be held.

If the uncommitted binary information 52, 54 is aborted, the write pointer 34 is repositioned to the same location as the commit pointer 32 (This state is the same as that illustrated in FIG. 3C.) The uncommitted binary information 52, 54 may be aborted if it has been found to contain unmanageable errors, be invalid binary information or not to be intended for use by the processor (not shown) associated with that interface 10.

The uncommitted binary information 52, 54 may further be aborted if the RAM 14 "overflows" (i.e., completely fills up to its capacity, as denoted by the write pointer 34 advancing to the same location as the read pointer 30, and further incoming binary information 26 continues to be received) and the as yet uncommitted binary information 52, 54 is of lower priority than the previously committed binary information 50. In other words, if reception of the uncommitted binary information 52, 54 interferes with retention of higher priority, previously committed binary information 50, the uncommitted binary information 52, 54 is aborted.

Figure 3E:
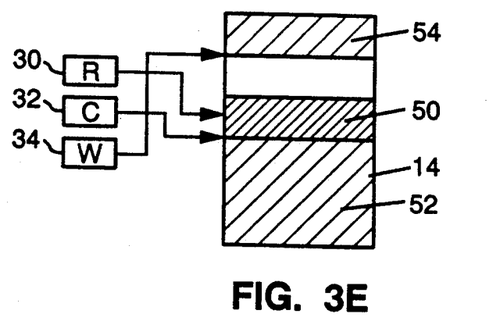

FIG. 3E illustrates the state where the committed binary information 50 is being read out for use by the processor (not shown) associated with the interface 10. As the committed binary information 50 is read out, the read pointer 30 advances. The read pointer 30 may advance up to, but no further than, the commit pointer 32. However, the read pointer 30 may not advance until the commit pointer 32 has been positioned at the same point as the write pointer 34, i.e., when the stored binary information 50 has become committed (as illustrated in FIG. 3C and discussed above). Thus, until the commit pointer 32 advances away from the read pointer 30, i.e., when stored binary information 50 becomes committed, no stored binary information 50 may be read out.

When an EOF 48 has been received, an EOF status flag (not shown) may be generated by and used within the pointer controller 20 for indicating whether an EOF 48 has been received. Comparing the status of this flag with the respective statuses of the memory pointers 30, 32, 34 will enable the pointer controller 20 to inform the processor (not shown) associated with the interface 10 as to the availability of data to be read out from the RAM 14.

For example, if the read pointer 30 has been advanced to the same position as the commit pointer 32 after all committed binary information 50 has been read out and the EOF status flag is set (i.e., indicating receipt of an EOF 48), then the pointer controller 20 may inform the processor that the end of a data frame 42 has been reached. The processor would then know that, until further incoming binary information 26 has been stored and committed, no further stored binary information 50 beyond the EOF 48 may be read out. However, if the read pointer 30 has been advanced to the same position as the commit pointer 32, but the EOF status flag is not set (i.e., indicating no receipt of an EOF 48), then the pointer controller 20 may inform the processor that further stored binary information 50 should be becoming available for reading out since the end of the incoming data frame 42 has not yet been reached.

Figure 3F:
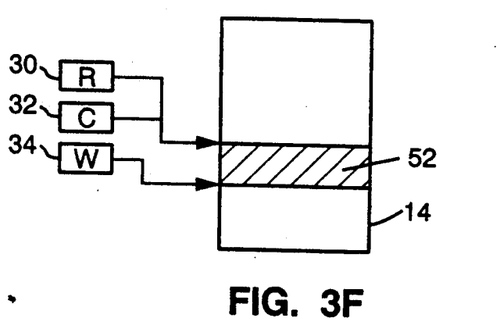

FIG. 3F illustrates the state where the write pointer 34 is advancing as new binary information 52 is stored (see discussion for FIG. 3D above) and the previously committed binary information 50 has been revoked. Upon revocation of previously committed binary information 50, the read pointer 30 is advanced to the same location as the commit pointer 32. When this occurs, the state of the FIFO queue within the RAM 14 is substantially the same as that when incoming binary information 26 is first being stored, as illustrated in FIGS. 3A and 3B and discussed above. The previously committed binary information 50 may be revoked when it has been found to contain unmanageable errors, be invalid binary information or be a lower priority data frame 42 than that currently being received. In other words, if retention of the previously committed binary information 50 interferes with reception of higher priority, incoming binary information 26, the previously committed binary information 50 is revoked.

Figure 4:
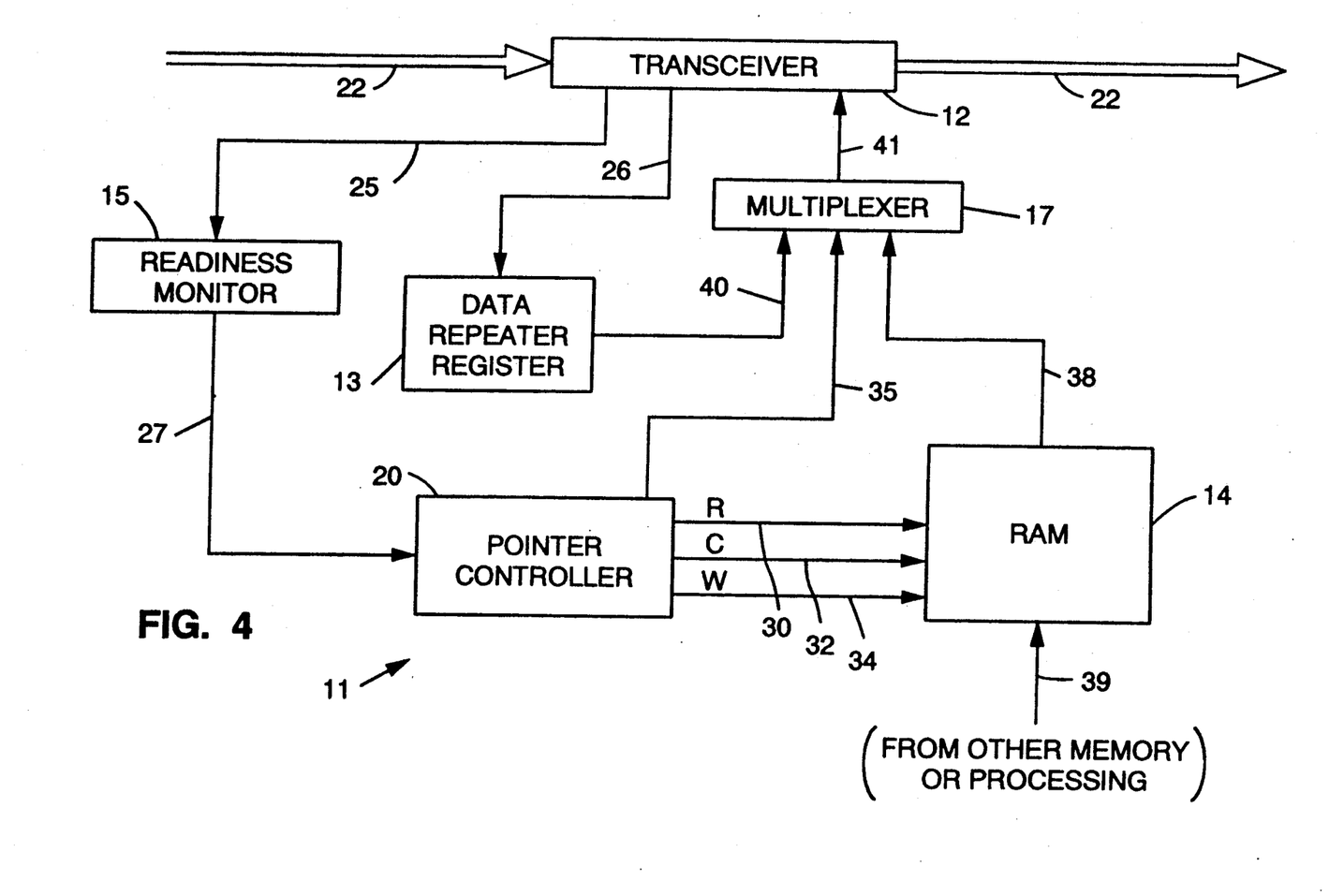
FIG. 4 illustrates a simplified, functional block diagram of a data communications system interface using an optical fiber ring LAN in which the FIFO memory configuration of the present invention is used in a data transmission mode.

FIG. 4 illustrates, in simplified, functional block diagram form, the major functional elements of a data communications system interface 11 using an optical fiber ring LAN 22 in which the FIFO memory configuration 14 of the present invention may be used for data transmission. Again, those of reasonable skill in the art will readily appreciate that use of this FIFO memory configuration 14 is not confined to this particular application and that this application is used merely for illustrative purposes only. For example, the FIFO memory configuration 14 of the present invention will perform equally well in system interfaces using a hard-wired bus (e.g., copper cables) or an electromagnetic link (e.g., "packet radio") as the shared data medium 22.

The basic functional elements in this particular application include an optical transceiver 12, a data repeater register 13, a random access memory ("RAM") 14, a readiness monitor 15, a multiplexer 17 and a pointer controller 20. (Note that in some other applications the data repeater register 13 and multiplexer 17 may not be necessary, particularly in a non-ring type of network topology, e.g., hard-wired bus.) These basic interface elements may be made up of combinations of numerous digital circuit devices commonly available and well known in the art.

Just as described above for the reception interface 10 of FIG. 1, this transmission interface 11 also maintains the integrity of the LAN 22. In this interface 11, the transceiver 12, data repeater register 13 and multiplexer 17 perform together as a binary information repeater.

The incoming binary information 26, temporarily stored within the data repeater register 13, is sent as repeated binary information 40 to the multiplexer 17. The multiplexer 17, unless instructed otherwise via its MUX control signal 35 from the pointer controller 20, sends this repeated binary information 40 to the transceiver 12 as transmitted binary information 41.

But, rather than receive and store incoming binary information 26 from the LAN 22 like the reception interface 10, the primary function of this transmission interface 11 is to transmit outgoing binary information 39 from the processor or other memory (not shown) associated therewith onto the LAN 22. During data transmission, the RAM 14 receives such outgoing binary information 39, stores it and awaits its instructions coming via the memory pointers 30, 32, 34 from the pointer controller 20. When it is so instructed, the RAM 14 retrieves this stored information and sends the outgoing binary information 38 to the multiplexer 17. In turn, when the multiplexer 17 is instructed via its MUX control signal 35 by the pointer controller 20, it sends the outgoing binary information 38 as transmitted binary information 41 to the transceiver 12. The transceiver 12 then transmits this transmitted binary information 41 onto the LAN 22.

Only committed binary information is transmitted onto the LAN 22 by the interface 11. Committed binary information is that for which a decision has been made to transmit onto the LAN 22. Uncommitted data is that for which no such decision has yet been made, but may still yet be made.

The primary criterion for the decision whether to commit is the availability and/or readiness of the LAN 22 to accept the outgoing binary information 38 from this interface 11. Other criteria include the presence within the RAM 14 of at least some of the outgoing binary information 39 intended to be transmitted, and the relative latency of the LAN 22 as compared to the latency of the processor or other memory (not shown) providing the outgoing binary information 39 to the RAM 14 for such transmission.

Thus, if the LAN 22 is not ready to accept the outgoing binary information 38 from the interface 11, no commitment and therefore no transmission will occur, regardless of whether the RAM 14 contains any outgoing binary information 39. But, if the LAN 22 is ready to accept the outgoing binary information 38 from the interface 11 and the RAM 14 contains enough of the outgoing binary information 39 to be transmitted, commitment and therefore transmission onto the LAN 22 will occur.

The state of readiness of the LAN 22 to accept the outgoing binary information 38 from the interface 11 is ascertained by the readiness monitor 15. The readiness monitor 15 receives a readiness status signal 25 from the transceiver 12. When the LAN 22 is ready, the readiness monitor 15 sends a signal 27 indicating this to the pointer controller 20. Then, when the RAM 14 contains enough of the outgoing binary information 39 to be transmitted (discussed below), transmission onto the LAN 22 will occur.

Transmission of the outgoing binary information 39 is controlled by the pointer controller 20. As described above for FIG. 3E, the read pointer 30 is advanced as outgoing binary information 38, i.e., committed binary information 50 committed for transmission, is read out of the RAM 14. Meanwhile, via the MUX control signal 35, the pointer controller 20 instructs the multiplexer 17 to route the outgoing binary information 38 committed for transmission to the transceiver 12 as the transmitted binary information 41.

However, if the LAN 22 is ready to accept the outgoing binary information 38 from the interface 11, but the RAM 14 contains only some, but not enough, of the outgoing binary information 39 to be transmitted, transmission may not yet begin. Transmission will begin only if what outgoing binary information 39 the RAM 14 does contain becomes committed. Commitment will occur only if the interface 11 is assured of receiving the remainder of the outgoing binary information 39 to be transmitted prior to or at least no later than the point in time when the last of the outgoing binary information 38 must be available for transmission onto the LAN 22.

This decision as to whether and when to commit to transmission (when the LAN 22 is ready to accept the outgoing binary information 38) is based upon the relative latency of the LAN 22 as compared to the latency of the processor or other memory (not shown) providing the outgoing binary information 39 to the RAM 14 for transmission. If the RAM 14 contains enough outgoing binary information 39 to send an uninterrupted frame of outgoing binary information 38 to the multiplexer 17, while the processor or other memory completes its transfer of outgoing binary information 39 into the RAM 14, commitment will occur.

In other words, if the rate at which the LAN 22 accepts the outgoing binary information 38 is not such as to cause the RAM 14 to "underrun" (i.e., run out of outgoing binary information 39, as denoted by the read pointer 30 advancing to the same location as the commit pointer 32) prior to receiving all outgoing binary information 39 intended for transmission, commitment will occur. Therefore, in making this decision to commit, the amount of outgoing binary information 39 currently held by the RAM 14 and the respective binary information transfer rates (i.e., from the processor or other memory to the interface 11 and from the interface 11 to the LAN 22) must be known.

The amount of outgoing binary information 39 currently held by the RAM 14 may be determined by the pointer controller 20 by comparing the address values for the read 30 or commit 32 pointer with the write 34 pointer. As for the binary information transfer rates, it will be readily appreciated by one of reasonable skill in the art that the logic constituting the pointer controller 20 may be preprogrammed with this information and perform the simple calculations necessary to make the commitment decision discussed above.

Prior to commitment, the state of the FIFO memory configuration within the RAM 14 is similar to that shown in FIGS. 3A and 3B and discussed above. Initially, all three memory pointers 30, 32, 34 are positioned together, as shown in FIG. 3A. As outgoing binary information 39 is written into the RAM 14, it is uncommitted binary information 50 and the write pointer 34 advances accordingly, as shown in FIG. 3B.

When commitment does occur, the state of the FIFO memory configuration within the RAM 14 is similar to that shown in FIGS. 3C and 3D and discussed above. When the commitment decision described above is made, the stored outgoing binary information 39 becomes committed binary information 50 and the commit pointer 32 is advanced to coincide with the write pointer 34, as shown in FIG. 3C. Once commitment occurs in this transmission interface 11, the commit pointer 32 does not remain stationary, but instead it advances together with the write pointer 34 as further outgoing binary information 39 is written into the RAM 14. Thus, once commitment occurs, all further outgoing binary information 39 written into the RAM 14 thereafter (e.g., until an EOF 48) is also committed binary information 50 committed for transmission onto the LAN 22.

Figure 3G:
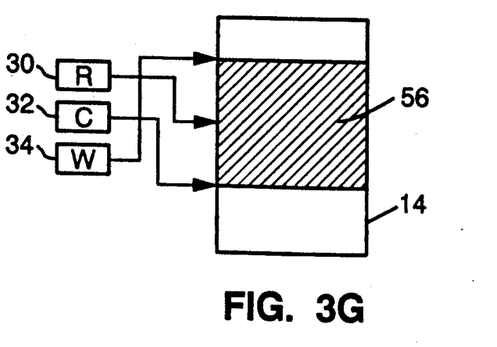

FIG. 3G illustrates the state where the three memory pointers 30, 32, 34 have been positioned so that the RAM 14 may be addressed in a "repeat" mode, e.g., when the interface 11 is transmitting the binary information 56 repetitiously into the shared data medium 22. The commit pointer 32 is advanced with respect to the write pointer 34. The read pointer 30 is originally positioned at the same point as the write pointer 34. The read pointer 30 then advances as the binary information 56 is read out from the RAM 14. When the read pointer 30 reaches the commit pointer 32, i.e., all binary information 56 has been read out, the read pointer 30 is repositioned at the same point as the write pointer 34. This allows this process of reading out the binary information 56 to be repeated. This repeat mode feature is useful for generating repeated binary information traffic within the LAN 22.

In order to operate in this repeat mode, the FIFO queue within the RAM 14 must be large enough to accommodate the entire frame 42 of binary information 56. However, this is not a serious limitation since in the FDDI protocol retransmission of a data frame 42, wherein this repeat mode is used, is typically used merely for diagnostic purposes.

It should be understood that various alternatives to the embodiments of the present invention described herein may be employed in practicing the present invention. It is intended that the following claims define the scope of the present invention and that structures and methods within the scope of these claims and their equivalents be covered thereby.

What is claimed is:

1. An improvement in a FIFO memory that provides first-in, first-out digital data storage and retrieval, sequentially inputting and storing digital data and sequentially retrieving and outputting said stored digital data, said FIFO memory comprising addressable memory means having memory locations for addressably inputting, storing, retrieving and outputting said digital data, said FIFO memory further comprising W-pointer means for addressing one of said memory locations into which said digital data is to be stored, and R-pointer means for addressing one of said memory locations from which said stored digital data is to be retrieved, wherein said improvement comprises:

C-pointer means for selectably addressing one of said memory locations which serves as a boundary between first and second subsets of said stored digital data within said FIFO memory; and commitment decision means for specifying said memory location to be addressed by said C-pointer means.

2. A FIFO memory means for providing first-in, first-out digital data storage and retrieval, sequentially inputting and storing digital data and sequentially retrieving and outputting said stored digital data, said digital data having start data and end data, said FIFO memory means comprising:

addressable memory means having memory locations for addressably inputting, storing, retrieving and outputting said digital data;

W-pointer means for addressing one of said memory locations into which said inputted digital data is to be stored;

R-pointer means for addressing one of said memory locations from which said stored digital data is to be retrieved;

C-pointer means for selectably addressing one of said memory locations which serves as a boundary between first and second subsets of said stored digital data within said FIFO memory means; and commitment decision means for specifying said memory location to be addressed by said C-pointer means.

3. A FIFO memory means as recited in claim 2, said FIFO memory means further comprising EOF-flagging means for indicating whether said end data of said digital data has been stored, W-positioning means for specifying said memory location to be addressed by said W-pointer means, and R-positioning means for specifying said memory location to be addressed by said R-pointer means.

4. A FIFO memory means as recited in claim 3, wherein said EOF-flagging means comprises a digital register.

5. A FIFO memory means as recited in claim 3, wherein each of said positioning means comprises a digital register.

6. A FIFO memory means as recited in claim 2 or 3, wherein said commitment decision means compares a subset of said inputted digital data with a predefined reference set of digital data.

7. A FIFO memory means as recited in claim 4, wherein said predefined reference set of digital data is peculiar to said FIFO memory means.

8. A FIFO memory means as recited in claim 6, wherein said commitment decision means comprises a digital comparator circuit.

9. A FIFO memory means as recited in claim 2 or 3 wherein said commitment decision means comprises a digital comparator circuit.

10. A FIFO memory means as recited in claim 2, said FIFO memory means further comprising outputting means for outputting said retrieved digital data, said outputting means having states of readiness and unreadiness, and wherein said commitment decision means monitors said states of readiness and unreadiness of said outputting means.

11. A FIFO memory means as recited in claim 10, wherein said commitment decision means comprises a digital register.

12. A FIFO memory means as recited in claim 10, wherein said outputting means comprises a digital data medium.

13. A FIFO memory means as recited in claim 2, 3 or 10, wherein said addressable memory means comprises a random access memory.

14. A FIFO memory means as recited in claim 2, 3 or 7, wherein each of said pointer means comprises a digital register.

15. A first-in, first-out memory system for sequentially inputting and storing digital data and sequentially retrieving and outputting said stored digital data, said memory system comprising:

a random access memory having a plurality of memory locations with individual addresses;

a W-pointer register providing the address of one of said memory locations into which said inputted digital data is to be stored;

an R-pointer register providing the address of one of said memory locations from which said stored digital data is to be retrieved;

a C-pointer register providing the address of one of said memory locations which is to serve as a boundary between first and second subsets of said stored digital data within said first-in, first-out memory system; and a comparator coupled to receive said inputted digital data and to compare a preselectable subset of said inputted digital data with a predefined reference set of digital data, and further coupled to provide a comparison signal indicative of whether said subset of inputted digital data matches said predefined reference set of digital data, wherein said addresses provided by said pointer registers are selectively responsive to said comparison signal.

16. A first-in, first-out memory system as recited in claim 15, wherein said predefined reference set of digital data is peculiar to said first-in, first-out memory system.

17. A first-in, first-out memory system for sequentially inputting and storing digital data and sequentially retrieving and outputting said stored digital data, said memory system comprising:

a random access memory having a plurality of memory locations with individual addresses;

a W-pointer register providing the address of one of said memory locations into which said inputted digital data is to be stored;

an R-pointer register providing the address of one of said memory locations from which said stored digital data is to be retrieved;

a C-pointer register providing the address of one of said memory locations which is to serve as a boundary between first and second subsets of said stored digital data within said first-in, first-out memory system;

a data medium onto which said retrieved data is outputted, said data medium having states of readiness and unreadiness; and a digital register coupled to receive a readiness status signal indicative of said states of readiness and unreadiness of said data medium, and further coupled to provide a readiness signal indicative of whether said data medium is ready to accept said retrieved digital data, wherein said addresses provided by said pointer registers are selectively responsive to said readiness signal.

18. A data interface system for inputting and storing digital data received from a shared data medium, said data interface system comprising:

a random access memory having a plurality of memory locations with individual addresses;

a W-pointer register providing the address of one of said memory locations into which said inputted digital data is to be stored;

an R-pointer register providing the address of one of said memory locations from which said stored digital data is to be retrieved;

a C-pointer register providing the address of one of said memory locations which is to serve as a boundary between first and second subsets of said stored digital data within said data interface system; and a comparator coupled to receive said inputted digital data and to compare a preselectable subset of said inputted digital data with a predefined reference set of digital data, and further coupled to provide a comparison signal indicative of whether said subset of inputted digital data matches said predefined reference set of digital data, wherein said addresses provided by said pointer registers are selectively responsive to said comparison signal.

19. A data interface system as recited in claim 18, wherein said predefined reference set of digital data is peculiar to said data interface system.

20. A data interface system for storing, retrieving and outputting digital data onto a shared data medium, said shared data medium having states of readiness and unreadiness with respect to the availability of said data medium to accept said digital data from said data interface system, said data interface system comprising:

a random access memory having a plurality of memory locations with individual addresses;

a W-pointer register providing the address of one of said memory locations into which said digital data is to be stored;

an R-pointer register providing the address of one of said memory locations from which said stored digital data is to be retrieved;

a C-pointer register providing the address of one of said memory locations which is to serve as a boundary between first and second subsets of said stored digital data within said data interface system; and a digital register coupled to receive a readiness status signal indicative of said states of readiness and unreadiness of said shared data medium, and further coupled to provide a readiness signal indicative of whether said shared data medium is ready to accept said retrieved digital data, wherein said addresses provided by said pointer registers are selectively responsive to said readiness signal.

* * * * *